(12) United States Patent
Hao et al.

(10) Patent No.: US 12,498,564 B2
(45) Date of Patent: Dec. 16, 2025

(54) CONTROL METHOD FOR IMPROVING DISPLAY EFFECT OF DISPLAY PANEL, CONTROL DEVICE THEREOF, AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Kexin Hao, Beijing (CN); Xin Duan, Beijing (CN); Shuhuan Yu, Beijing (CN); Bin Wang, Beijing (CN); Shaoru Zhang, Beijing (CN); Zhaoyun Gu, Beijing (CN); Jiaqi Fan, Beijing (CN)

(73) Assignees: Beijing BOE Optoelectronics Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/768,759

(22) PCT Filed: May 25, 2021

(86) PCT No.: PCT/CN2021/095812
§ 371 (c)(1),
(2) Date: Apr. 13, 2022

(87) PCT Pub. No.: WO2022/246649
PCT Pub. Date: Dec. 1, 2022

(65) Prior Publication Data
US 2024/0111150 A1 Apr. 4, 2024

(51) Int. Cl.
*G02B 27/00* (2006.01)
*G09G 3/20* (2006.01)
*G09G 3/3208* (2016.01)

(52) U.S. Cl.
CPC ....... *G02B 27/0093* (2013.01); *G09G 3/2096* (2013.01); *G09G 3/3208* (2013.01); *G09G 2310/0243* (2013.01)

(58) Field of Classification Search
CPC .......................... G02B 27/0093; G09G 3/2096
See application file for complete search history.

(56) References Cited

U.S. PATENT DOCUMENTS

| 2012/0288139 | A1* | 11/2012 | Singhar | G06F 1/3231 |
| | | | | 382/103 |
| 2016/0125785 | A1* | 5/2016 | Wang | G09G 3/3648 |
| | | | | 345/582 |

(Continued)

FOREIGN PATENT DOCUMENTS

| CN | 107797280 A | 3/2018 |
| CN | 107945766 A | 4/2018 |

(Continued)

*Primary Examiner* — William Boddie
*Assistant Examiner* — Andrew B Schnirel
(74) *Attorney, Agent, or Firm* — The Webb Law Firm

(57) ABSTRACT

The present disclosure provides a control method for a display panel, a control device thereof, and a display device. This control method includes: obtaining spatial position coordinates of a pupil of a user; determining coordinates of a gaze point in a display area of a display panel viewed by the user according to the spatial position coordinates of the pupil; determining an area range that the pupil of the user is gazing in the display area according to the spatial position coordinates of the pupil, the coordinates of the gaze point and a preset visual angle; determining a gaze area and a non-gaze area in the display area according to the area range, wherein the gaze area is adjacent to the non-gaze area; and adjusting a first gate driving signal input to the gaze area and a second gate driving signal input to the non-gaze area.

14 Claims, 7 Drawing Sheets

(56) References Cited

U.S. PATENT DOCUMENTS

| | | | |
|---|---|---|---|
| 2018/0059420 A1 | 3/2018 | Woo et al. | |
| 2018/0095274 A1* | 4/2018 | Lee | G02B 27/0012 |
| 2018/0182279 A1* | 6/2018 | Sakariya | G09G 3/2088 |
| 2018/0224935 A1* | 8/2018 | Thunström | G06F 3/013 |
| 2018/0366068 A1* | 12/2018 | Liu | G06V 40/171 |
| 2019/0138092 A1 | 5/2019 | Song | |
| 2019/0180672 A1* | 6/2019 | Knez | G09G 5/397 |
| 2019/0206315 A1 | 7/2019 | Park et al. | |
| 2019/0237021 A1* | 8/2019 | Peng | G09G 5/003 |
| 2019/0325823 A1 | 10/2019 | Yang et al. | |
| 2020/0279534 A1 | 9/2020 | Ji et al. | |
| 2021/0049981 A1* | 2/2021 | Seiler | H04N 13/398 |
| 2021/0056719 A1 | 2/2021 | Li et al. | |
| 2021/0166607 A1 | 6/2021 | Li et al. | |
| 2021/0225329 A1 | 7/2021 | Shi et al. | |
| 2021/0341998 A1 | 11/2021 | Sun | |

FOREIGN PATENT DOCUMENTS

| | | |
|---|---|---|
| CN | 108877664 A | 11/2018 |
| CN | 108877715 A | 11/2018 |
| CN | 109388448 A | 2/2019 |
| CN | 109658876 A | 4/2019 |
| CN | 109658900 A | 4/2019 |
| CN | 109994073 A | 7/2019 |
| CN | 110023881 A | 7/2019 |
| CN | 110032271 A | 7/2019 |
| CN | 110460831 A | 11/2019 |
| CN | 110853566 A | 2/2020 |
| CN | 112102172 A | 12/2020 |

\* cited by examiner

CONTROL METHOD FOR IMPROVING DISPLAY EFFECT OF DISPLAY PANEL, CONTROL DEVICE THEREOF, AND DISPLAY DEVICE

CROSS-REFERENCE TO RELATED APPLICATION

The present application is the U.S. National Stage Application of International Patent Application No. PCT/CN2021/095812, filed May 25, 2021, the disclosure of which is hereby incorporated by reference in its entirety.

TECHNICAL FIELD

The present disclosure relates to a control method for a display panel, a control device thereof, and a display device.

BACKGROUND

OLED (Organic Light-Emitting Diode) display screen is a display screen made of organic light emitting diodes, which has the advantages of without the need of backlight, high contrast, thin thickness, wide viewing angle, fast response speed and so on, and can be used for flexible panels. In the design of the OLED display screen of the related art, it is usually necessary to perform unified internal compensation and/or external compensation on the entire screen to improve the display effect of the OLED display screen.

SUMMARY

According to an aspect of an embodiment of the present disclosure, there is provided a control method for a display panel, comprising: obtaining spatial position coordinates of a pupil of a user; determining coordinates of a gaze point in a display area of a display panel viewed by the user according to the spatial position coordinates of the pupil; determining an area range that the pupil of the user is gazing in the display area according to the spatial position coordinates of the pupil, the coordinates of the gaze point and a preset visual angle; determining a gaze area and a non-gaze area in the display area according to the area range, wherein the gaze area is adjacent to the non-gaze area; and adjusting a first gate driving signal input to the gaze area and a second gate driving signal input to the non-gaze area, so that a duty cycle of the first gate driving signal is greater than a duty cycle of the second gate driving signal, or a voltage of the first gate driving signal is greater than a voltage of the second gate driving signal, or a frequency of the first gate driving signal is less than a frequency of the second gate driving signal.

In some embodiments, the non-gaze area comprises a transition area adjacent to the gaze area and a distal area on a side of the transition area away from the gaze area; the second gate driving signal comprises a transition area gate driving signal input to the transition area and a distal area gate driving signal input to the distal area; wherein the adjusting of the second gate driving signal comprises: adjusting the transition area gate driving signal and the distal area gate driving signal, so that a duty cycle of the transition area gate driving signal is greater than a duty cycle of the distal area gate driving signal, or a voltage of the transition area gate driving signal is greater than a voltage of the distal area gate driving signal, or a frequency of the transition area gate driving signal is less than a frequency of the distal area gate driving signal.

In some embodiments, the transition area comprises a plurality of sub-transition areas arranged along a direction from the gaze area to the distal area; the transition area gate driving signal comprises a plurality of sub-transition area gate driving signals input to the plurality of sub-transition areas, the plurality of sub-transition area gate driving signals being in one-to-one correspondence with the plurality of sub-transition areas; wherein the adjusting of the transition area gate driving signal comprises: adjusting the plurality of sub-transition area gate driving signals input to the plurality of sub-transition areas, so that the closer a sub-transition area is to the gaze area, the greater a duty ratio or a voltage of a sub-transition area gate driving signal input to the sub-transition area, or the less a frequency of the sub-transition area gate driving signal input to the sub-transition area.

In some embodiments, the display area comprises a plurality of rows of sub-pixels; the gaze area comprises a part of rows of sub-pixels in the plurality of rows of sub-pixels, and the non-gaze area comprises anther part of rows of sub-pixels in the plurality of rows of sub-pixels.

In some embodiments, the display area comprises a plurality of sub-display areas, and each sub-display area of the plurality of sub-display areas comprises a plurality of rows of sub-pixels; and the determining of the gaze area and the non-gaze area according to the area range comprises: obtaining a sub-display area at least partially overlapping with the area range from the plurality of sub-display areas, using the sub-display area at least partially overlapping with the area range as the gaze area, and using a remaining sub-display area in the plurality of sub-display areas except for the sub-display area serving as the gaze area as the non-gaze area.

In some embodiments, the display panel comprises a plurality of gate driving circuits; and the adjusting of the first gate driving signal and the second gate driving signal comprises: outputting a first control signal to a portion of gate driving circuits corresponding to the gaze area in the plurality of gate driving circuits to cause the portion of the gate driving circuits to output the first gate driving signal, and outputting a second control signal to another portion of gate driving circuits corresponding to the non-gaze area in the plurality of gate driving circuits to cause the another portion of the gate driving circuits to output the second gate driving signal.

In some embodiments, the plurality of gate driving circuits comprise a plurality of groups of gate driving circuits connected to the plurality of sub-display areas in a one-to-one correspondence, each group of the plurality of groups of gate driving circuits being configured to independently receive the first control signal or the second control signal; and the outputting of the first control signal or the outputting of the second control signal comprises: for any one sub-display area of the plurality of sub-display areas, outputting the first control signal to a group of gate driving circuits corresponding to the any one sub-display area in a case where the any one sub-display area is determined to belong to the gaze area, and outputting the second control signal to a group of gate driving circuits corresponding to the any one sub-display area in a case where the any one sub-display area is determined to belong to the non-gaze area.

In some embodiments, the determining of the area range that the pupil of the user is gazing in the display area comprises: calculating a distance between the pupil and the gaze point according to the spatial position coordinates of the pupil and the coordinates of the gaze point; and determining the area range that the pupil of the user is gazing in the display area according to the distance and the preset visual angle.

In some embodiments, the obtaining of the spatial position coordinates of the pupil comprises: obtaining a face image captured by a camera; performing facial feature point detection on the face image to obtain a human eye region; performing pupil detection on the human eye region to obtain center position coordinates of the pupil; obtaining a face posture through calculation according to the face image; and obtaining the spatial position coordinates of the pupil through calculation according to the face posture and the center position coordinates of the pupil.

According to another aspect of an embodiment of the present disclosure, there is provided a control device for a display panel, comprising: a coordinate obtaining circuit configured to obtain spatial position coordinates of a pupil of a user, and determine coordinates of a gaze point in a display area of a display panel viewed by the user according to the spatial position coordinates of the pupil; an area determination circuit configured to determine an area range that the pupil of the user is gazing in the display area according to the spatial position coordinates of the pupil, the coordinates of the gaze point and a preset visual angle, and determine a gaze area and a non-gaze area in the display area according to the area range, wherein the gaze area is adjacent to the non-gaze area; and a signal adjustment circuit configured to adjust a first gate driving signal input to the gaze area and a second gate driving signal input to the non-gaze area, so that a duty cycle of the first gate driving signal is greater than a duty cycle of the second gate driving signal, or a voltage of the first gate driving signal is greater than a voltage of the second gate driving signal, or a frequency of the first gate driving signal is less than a frequency of the second gate driving signal.

According to another aspect of an embodiment of the present disclosure, there is provided a control device for a display panel, comprising: a memory; a processor coupled to the memory, the processor configured to, based on instructions stored in the memory, carry out the method described above.

According to still another aspect of an embodiment of the present disclosure, there is provided a field programmable gate array (FPGA), comprising the control device described above.

In some embodiments, the FPGA further comprises: a display interface circuit configured to parse received image information; and a data mapping circuit electrically connected to the display interface circuit and configured to map parsed image information into display data and input the display data to a display panel.

In some embodiments, the FPGA further comprises: a mode setting circuit configured to set a display mode and transmit the display mode to the data mapping circuit and the control device; wherein the data mapping circuit is configured to map the parsed image information into corresponding display data according to the display mode; and the control device is configured to output a first control signal corresponding to the gaze area and a second control signal corresponding to the non-gaze area according to the display mode.

According to still another aspect of an embodiment of the present disclosure, there is provided a display device comprising the control device described above.

According to still another aspect of the present invention, there is provided a non-transitory computer readable storage medium having stored thereon computer program instructions which, when executed by a processor, implement the method described above.

Other features and advantages of the present invention will become apparent from the following detailed description of exemplary embodiments of the present disclosure with reference to the accompanying drawings.

BRIEF DESCRIPTION OF THE DRAWINGS

The accompanying drawings, which constitute a portion of this specification, illustrate embodiments of the present disclosure and, together with the description, serve to explain the principles of the present disclosure.

The present disclosure will be more clearly understood from the following detailed description with reference to the accompanying drawings, in which.

Figure 1:
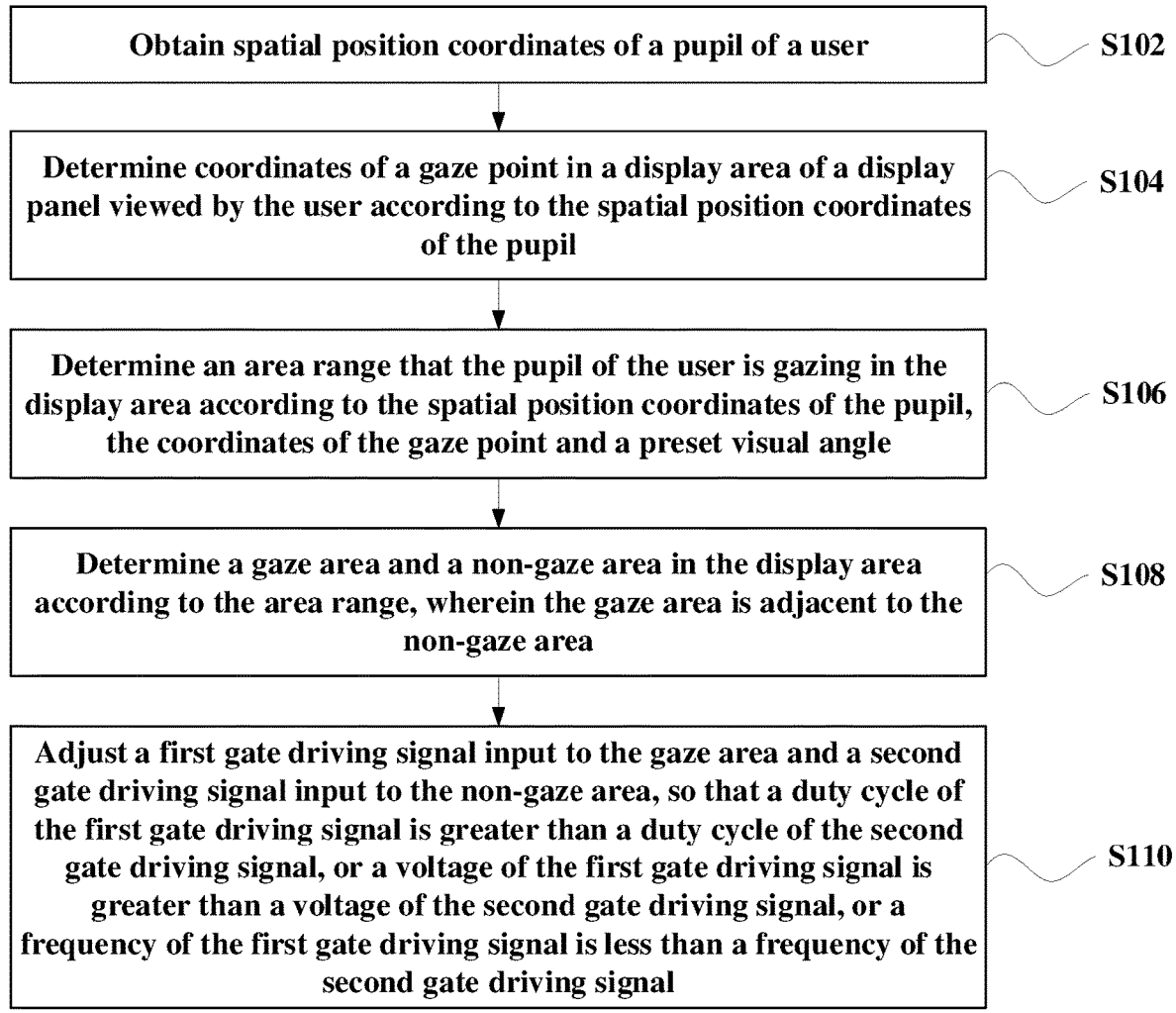
FIG. 1 is a flowchart illustrating a control method for a display panel according to an embodiment of the present disclosure.

It should be understood that the dimensions of various parts shown in the accompanying drawings are not necessarily drawn according to actual proportional relations. In addition, the same or similar reference signs are used to denote the same or similar components.

DETAILED DESCRIPTION

Various exemplary embodiments of the present disclosure will now be described in detail in conjunction with the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "include", or the like means that the element before the word covers the element(s) listed after the word without excluding the possibility of also covering other elements. The terms "up", "down", "left", "right", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (comprising technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The inventors of the present disclosure found that with the improvement of the resolution of a display screen (especially in the Y direction), the time budget for the turning-on of each row of sub-pixels of the display screen is reduced. As a result, the solution of the related art may not have enough time to take into account the compensation time and effect of each row of sub-pixels while ensuring the high resolution of the display screen. Thereby, the display effect of the display screen is reduced.

In view of this, some embodiments of the present disclosure provide a control method for a display panel to improve the display effect of a display screen. A control method for a display panel according to some embodiments of the present disclosure will be described in detail below with reference to the accompanying drawings.

Figure 2:
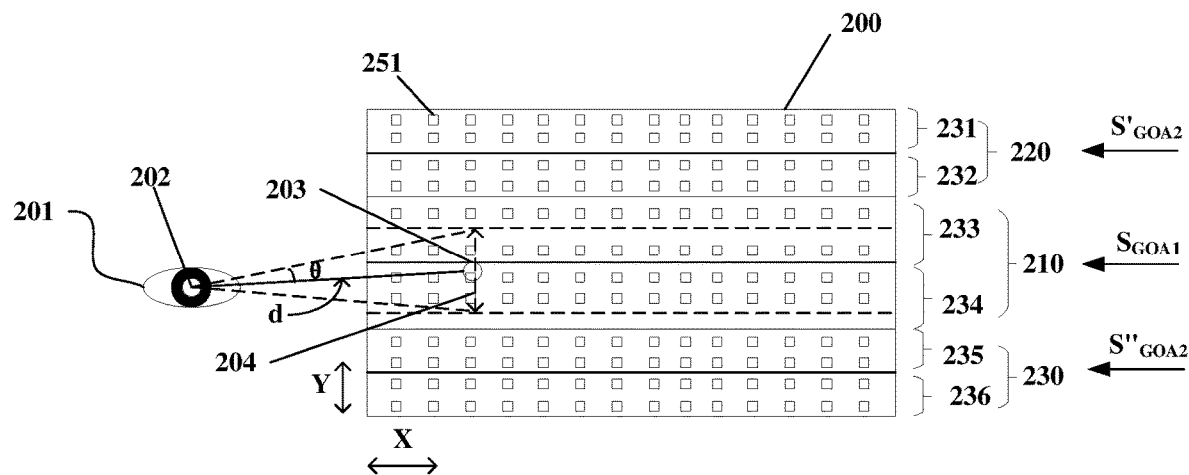
FIG. 2 is a schematic diagram illustrating partitioning a display area of a display panel according to an embodiment of the present disclosure.

FIG. 1 is a flowchart illustrating a control method for a display panel according to an embodiment of the present disclosure. FIG. 2 is a schematic diagram illustrating partitioning a display area of a display panel according to an embodiment of the present disclosure. A control method for a display panel according to some embodiments of the present disclosure will be described in detail below with reference to FIGS. 1 and 2.

As shown in FIG. 1, at step S102, spatial position coordinates of a pupil of a user are obtained. The process of obtaining spatial position coordinates of the pupil will be described in detail later with reference to FIG. 6.

At step S104, coordinates of a gaze point in a display area of the display panel viewed by the user are determined according to the spatial position coordinates of the pupil.

For example, as shown in FIG. 2, coordinates of a gaze point 203 in a display area 200 of the display panel viewed by the user are determined according to the spatial position coordinates of the pupil 202 in the user's eye 201. Here, coordinates of the gaze point can be determined according to the spatial position coordinates of the pupil using known techniques.

Returning to FIG. 1, at step S106, an area range that the pupil of the user is gazing in the display area is determined according to the spatial position coordinates of the pupil, the coordinates of the gaze point and a preset visual angle.

In some embodiments, the step S106 comprises: as shown in FIG. 2, calculating a distance d between the pupil 202 and the gaze point 203 according to the spatial position coordinates of the pupil 202 and the coordinates of the gaze point 203; and determining an area range 204 that the pupil 202 of the user is gazing in the display area 200 according to the distance d and a preset visual angle θ. Here, the area range 204 is the area between two dotted lines extending along a row direction (i.e., the X direction) in FIG. 2.

In some embodiments, a range of the preset visual angle θ is $-10°≤θ≤10°$. For example, the preset visual angle θ is $±1.5°$. Certainly, it can be understood by those skilled in the art that the range of the preset visual angle θ here is only exemplary, and the scope of the embodiments of the present disclosure is not limited thereto.

At step S108, a gaze area and a non-gaze area in the display area are determined according to the area range, wherein the gaze area is adjacent to the non-gaze area.

In some embodiments, as shown in FIG. 2, the display area 200 comprises a plurality of sub-display areas 231 to 236. For example, the display area may be divided into a plurality of sub-display areas 231 to 236 in advance along the Y direction. Each sub-display area comprises a plurality of rows of sub-pixels 251.

In some embodiments, the step S108 comprises: obtaining a sub-display area at least partially overlapping with the area range from the plurality of sub-display areas, using the sub-display area at least partially overlapping with the area range as the gaze area, and using a remaining sub-display area in the plurality of sub-display areas except for the sub-display area serving as the gaze area as the non-gaze area.

For example, as shown in FIG. 2, sub-display areas 233 and 234 at least partially overlapping with the area range 204 are obtained from the plurality of sub-display areas 231 to 236, the sub-display areas 233 and 234 at least partially overlapping with the area range 204 are used as the gaze area 210, and then remaining sub-display areas 231, 232, 235 and 236 in the plurality of sub-display areas 231 to 236 except for the sub-display areas 233 and 234 serving as the gaze area are used as the non-gaze area. For example, as shown in FIG. 2, the sub-display areas 231 and 232 together serve as a first non-gaze area 220, and the sub-display areas 235 and 236 together serve as a second non-gaze area 230. As shown in FIG. 2, the first non-gaze area 220 and the second non-gaze area 230 are respectively on opposite sides of the gaze area 210.

In some embodiments, as shown in FIG. 2, the display area 200 comprises a plurality of rows of sub-pixels 251; the gaze area 210 comprises a part of rows of sub-pixels in the plurality of rows of sub-pixels, and the non-gaze area 220 (or 230) comprises anther part of rows of sub-pixels in the plurality of rows of sub-pixels.

Returning to FIG. 1, at step S110, a first gate driving signal input to the gaze area and a second gate driving signal input to the non-gaze area are adjusted, so that a duty cycle of the first gate driving signal is greater than a duty cycle of the second gate driving signal, or a voltage of the first gate driving signal is greater than a voltage of the second gate driving signal, or a frequency of the first gate driving signal is less than a frequency of the second gate driving signal.

It should be noted that the duty cycle is the proportion of the active-level duration of a gate driving signal in one cycle. It should also be noted that "the voltage of the first gate driving signal is greater than the voltage of the second gate driving signal" means that an absolute value of the voltage of the first gate driving signal is greater than an absolute value of the voltage of the second gate driving signal.

For example, as shown in FIG. 2, a first gate driving signal $S_{GOA1}$ is input to the gaze area 210, a second gate driving signal $S'_{GOA2}$ is input to the first non-gaze area 220, and another second gate driving signal $S''_{GOA2}$ is input to the second non-gaze area 230.

The first gate driving signal and the second gate driving signal will be described below with reference to FIGS. 5A to 5C, respectively.

Figure 5A:
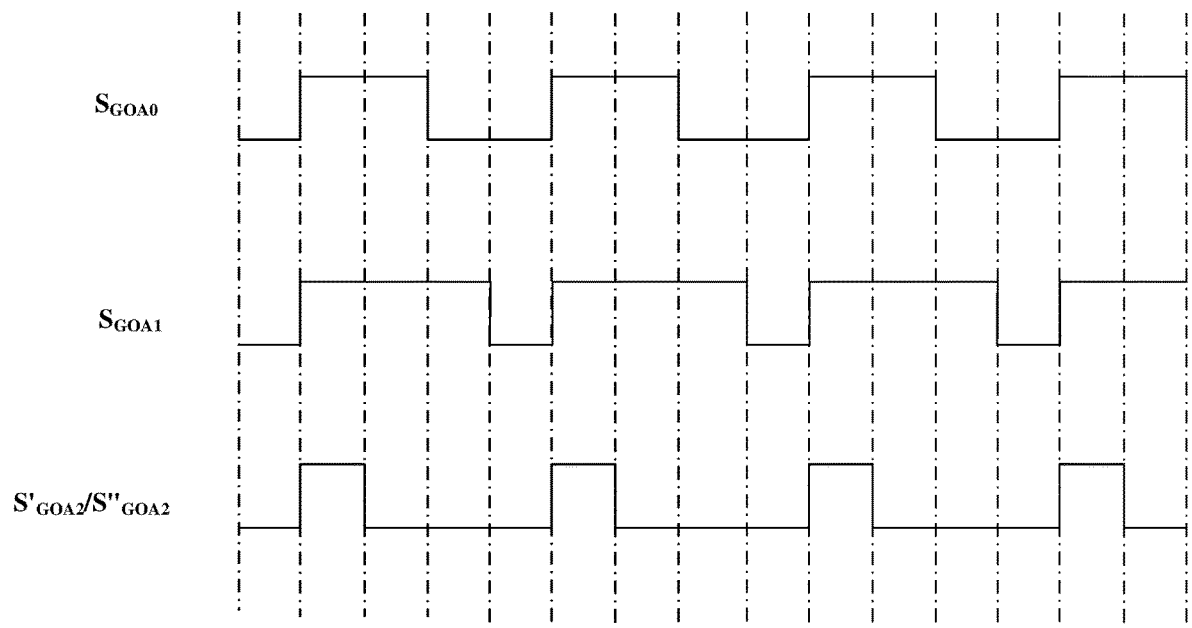
FIG. 5A is a waveform diagram illustrating gate driving signals input to a display area according to an embodiment of the present disclosure.

FIG. 5A is a waveform diagram illustrating gate driving signals input to a display area according to an embodiment of the present disclosure. FIG. 5A shows a waveform diagram of an original gate driving signal $S_{GOA0}$ input to the display area that is not divided into a gaze area and a non-gaze area, and shows the waveform diagrams of the first gate driving signal $S_{GOA1}$ and the second gate driving signals $S'_{GOA2}$ and $S''_{GOA2}$. Here, preferably, the gate driving signals shown in FIG. 5A may be output signals of the gate driving circuits.

As shown in FIG. 5A, a duty cycle of the first gate driving signal $S_{GOA1}$ is greater than a duty cycle of the second gate driving signal $S'_{GOA2}$ (or $S''_{GOA2}$). In addition, in some embodiments, it can be seen from FIG. 5A that the duty cycle of the first gate driving signal $S_{GOA1}$ is greater than a duty cycle of the original gate driving signal $S_{GOA0}$, while the duty cycle of the second gate driving signal $S'_{GOA2}$ (or $S''_{GOA2}$) is less than the duty cycle of the original gate driving signal $S_{GOA0}$.

As is well known, the gate driving signal is used to turn on a gate of a transistor of a pixel driving circuit of a sub-pixel after the gate driving signal is input to the display area. However, in the above embodiment of the present disclosure, since the duty cycle of the first gate driving signal $S_{GOA1}$ is greater than the duty cycle of the second gate driving signal $S'_{GOA2}$ (or $S'_{GOA2}$), which is equivalent to increasing the duty cycle of the gate driving signal input to the gaze area, each row of sub-pixels in the gaze area can be turned on for a longer time than each row of sub-pixels in the non-gaze area. Therefore, display data can be input to the sub-pixels of the gaze area more fully, and the sub-pixels in the gaze area can emit light more fully, which can improve the display effect of the display panel.

The duty cycle of the second gate driving signal $S'_{GOA2}$ (or $S''_{GOA2}$) is relatively small. For example, the duty cycle of the second gate driving signal $S'_{GOA2}$ (or $S''_{GOA2}$) is less than the duty cycle of the original gate driving signal $S_{GOA0}$. This can reduce the turn-on time of each row of sub-pixels in the non-gaze area, and is beneficial to supplement the turn-on time of each row of sub-pixels in the gaze area with the reduced time.

Here, it should be noted that since the human eyes do not pay much attention to the non-gaze area, even if the turn-on time of each row of sub-pixels in the non-gaze area is reduced, it does not affect the display effect of the image displayed in the entire display area that is viewed by the human eyes.

The above method of changing the duty ratio of the gate driving signal can improve the maximum supportable resolution of the display panel, thereby further improving the display effect of the display panel.

For example, in the case where the display area is not divided into a gaze area and a non-gaze area, if a compensation time of 6 μs (microseconds) per line needs to be satisfied, under the premise of full screen display at 60 Hz, the maximum supportable resolution in the Y direction is $$\frac{1}{60 \text{ Hz} * 6 \text{ } \mu s} = 2778 \text{ Line} \tag{1}$$

According to the solution of the embodiment of the present disclosure, for example, the gaze area occupies ⅓ of the display area, and the non-gaze area occupies ⅔ of the display area. Assuming that the duty cycle of the second gate driving signal $S'_{GOA2}$ (or $S''_{GOA2}$) is 70% of the duty cycle of the first gate driving signal $S_{GOA1}$, that is, the turn-on time of each row of sub-pixels in the non-gaze area is 70% of the turn-on time of each row of sub-pixels in the gaze area, the maximum supportable resolution of the display area in the Y direction can reach 3472 Lines. Here, assuming that the maximum supportable resolution of the display area in the Y direction is X, the following equation is satisfied:

$$\frac{1}{60 \text{ Hz}} - X * \frac{1}{3} * 6 \text{ } \mu s = X * \frac{2}{3} * 6 \text{ } \mu s * 70\%, \tag{2}$$

from which, X=3472 Line can be calculated.

Obviously, through adopting the above method of the embodiment of the present disclosure, the maximum supportable resolution of the display panel can be increased.

Figure 5B:
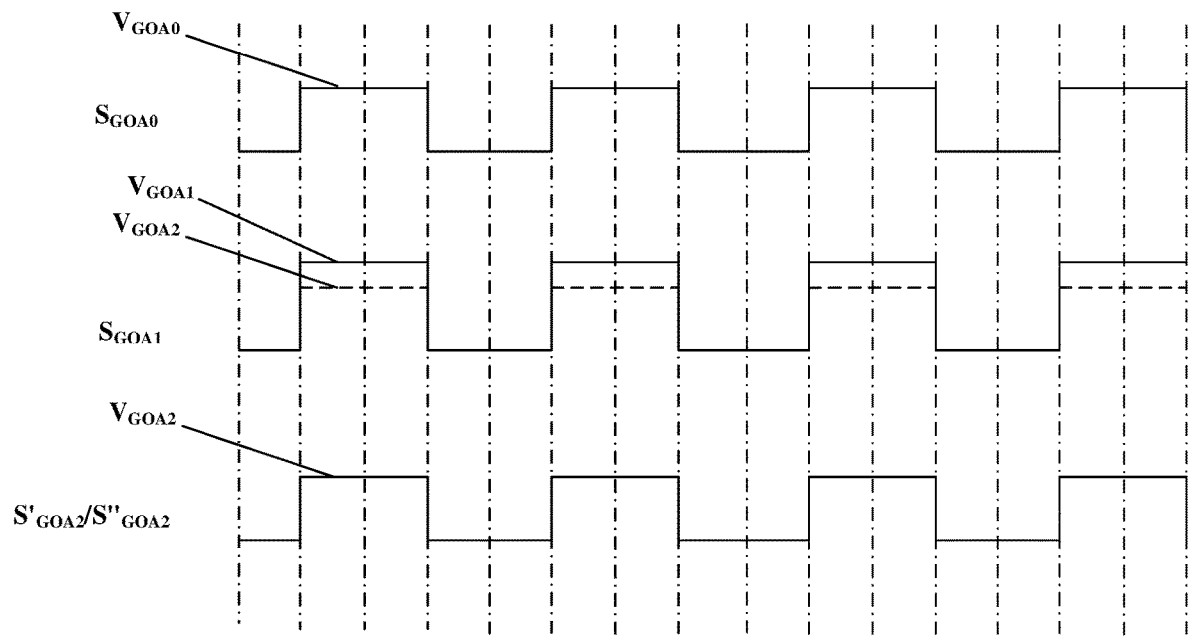
FIG. 5B is a waveform diagram illustrating gate driving signals input to a display area according to another embodiment of the present disclosure.

FIG. 5B is a waveform diagram illustrating gate driving signals input to a display area according to another embodiment of the present disclosure. Here, preferably, the gate driving signals shown in FIG. 5B may be output signals of the gate driving circuits.

FIG. 5B shows a waveform diagram of an original gate driving signal $S_{GOA0}$ input to the display area that is not divided into a gaze area and a non-gaze area, and shows the waveform diagrams of the first gate driving signal $S_{GOA1}$ and the second gate driving signals $S'_{GOA2}$ and $S''_{GOA2}$.

As shown in FIG. 5B, a voltage of the first gate driving signal $S_{GOA1}$ is greater than a voltage of the second gate driving signal $S'_{GOA2}$ (or $S''_{GOA2}$). In addition, in some embodiments, it can be seen from FIG. 5B that the voltage $V_{GOA1}$ of the first gate driving signal $S_{GOA1}$ is greater than a voltage $V_{GOA0}$ of the original gate driving signal $S_{GOA0}$, while the voltage $V_{GOA2}$ of the second gate driving signal $S'_{GOA2}$ (or $S''_{GOA2}$) is equal to the voltage $V_{GOA0}$ of the original gate driving signal $S_{GOA0}$.

In the above embodiment of the present disclosure, since the voltage $V_{GOA1}$ of the first gate driving signal $S_{GOA1}$ is greater than the voltage $V_{GOA2}$ of the second gate driving signal $S'_{GOA2}$ (or $S''_{GOA2}$), which is equivalent to increasing the voltage of the gate driving signal input to the gaze area, each row of sub-pixels in the gaze area can be turned on more fully than each row of sub-pixels in the non-gaze area. Therefore, the display data can be more fully input to the sub-pixels in the gaze area, and the sub-pixels in the gaze area can emit light more fully, which can improve the display effect of the display panel.

Figure 5C:
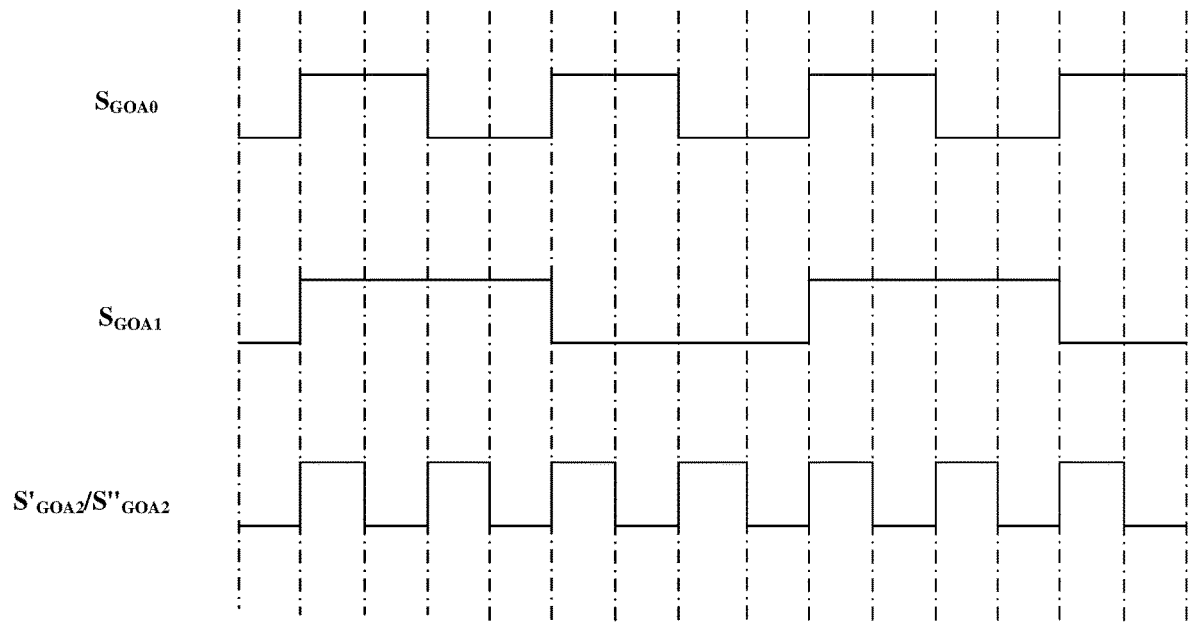
FIG. 5C is a waveform diagram illustrating gate driving signals input to a display area according to still another embodiment of the present disclosure.

FIG. 5C is a waveform diagram illustrating gate driving signals input to a display area according to still another embodiment of the present disclosure. Here, preferably, the gate driving signals shown in FIG. 5C may be clock signals of the gate driving circuits.

FIG. 5C shows a waveform diagram of an original gate driving signal $S_{GOA0}$ input to the display area that is not divided into a gaze area and a non-gaze area, and shows the waveform diagrams of the first gate driving signal $S_{GOA1}$ and the second gate driving signals $S'_{GOA2}$ and $S''_{GOA2}$.

As shown in FIG. 5C, a frequency of the first gate driving signal $S_{GOA1}$ is less than a frequency of the second gate driving signal $S'_{GOA2}$ (or $S''_{GOA2}$). In addition, in some embodiments, it can be seen from FIG. 5C that the frequency of the first gate driving signal $S_{GOA1}$ is less than a frequency of the original gate driving signal $S_{GOA0}$, while the frequency of the second gate driving signal $S'_{GOA2}$ (or $S''_{GOA2}$ is greater than the frequency of the original gate driving signal $S_{GOA0}$.

In the above embodiment of the present disclosure, since the frequency of the first gate driving signal $S_{GOA1}$ is less than the frequency of the second gate driving signal $S'_{GOA2}$ (or $S''_{GOA2}$), each row of sub-pixels in the gaze area can be turned on for a longer time than each row of sub-pixels in the non-gaze area. Therefore, display data can be input to the sub-pixels in the gaze area more fully, and the sub-pixels in the gaze area can emit light more fully, which can improve the display effect of the display panel.

The frequency of the second gate driving signal $S'_{GOA2}$ (or $S''_{GOA2}$) is relatively greater, for example, the frequency of the second gate driving signal $S'_{GOA2}$ (or $S''_{GOA2}$) is greater than the frequency of the original gate driving signal $S_{GOA0}$, which can reduce the turn-on time of each row of sub-pixels in the non-gaze area, and is beneficial to supplement the turn-on time of each row of sub-pixels in the gaze area with the reduced time.

Here, it should be noted that since the human eyes do not pay much attention to the non-gaze area, even if the turn-on time of each row of sub-pixels in the non-gaze area is reduced, it does not affect the display effect of the image displayed in the entire display area that is viewed by the human eyes.

In addition, similar to that described above, the method of changing the frequency of the gate driving signal can improve the maximum supportable resolution of the display panel, thereby further improving the display effect of the display panel.

In some embodiments, the display panel comprises a plurality of gate driving circuits. A portion of the plurality of gate driving circuits corresponds to the gaze area, and another portion of the plurality of gate driving circuits corresponds to the non-gaze area.

In some embodiments, the step S110 comprises: outputting a first control signal to a portion of gate driving circuits corresponding to the gaze area in the plurality of gate driving circuits to cause the portion of the gate driving circuits to output the first gate driving signal, and outputting a second control signal to another portion of gate driving circuits corresponding to the non-gaze area in the plurality of gate driving circuits to cause the another portion of the gate driving circuits to output the second gate driving signal.

In some embodiments, the plurality of gate driving circuits comprise a plurality of groups of gate driving circuits. That is, the plurality of gate driving circuits are divided into a plurality of groups of gate driving circuits. The plurality of groups of gate driving circuits are connected to the plurality of sub-display areas of the display area in a one-to-one correspondence. Each group of the plurality of groups of gate driving circuits is configured to independently receive the first control signal or the second control signal. That is, each group of gate driving circuits is independently controlled by the first control signal or the second control signal, and gate driving circuits in different groups do not transmit control signals to each other.

In some embodiments, the outputting of the first control signal or the outputting of the second control signal comprises: for any one sub-display area of the plurality of sub-display areas, outputting the first control signal to a group of gate driving circuits corresponding to the any one sub-display area in a case where the any one sub-display area is determined to belong to the gaze area, and outputting the second control signal to a group of gate driving circuits corresponding to the any one sub-display area in a case where the any one sub-display area is determined to belong to the non-gaze area. In this way, whether a group of gate driving circuits corresponding to the sub-display area output the first gate driving signal or the second gate driving signal is adjusted according to whether the sub-display area belongs to the gaze area or the non-gaze area.

Heretofore, a control method for a display panel according to an embodiment of the present disclosure is provided. The control method comprises: obtaining spatial position coordinates of a pupil of a user; determining coordinates of a gaze point in a display area of a display panel viewed by the user according to the spatial position coordinates of the pupil; determining an area range that the pupil of the user is gazing in the display area according to the spatial position coordinates of the pupil, the coordinates of the gaze point and a preset visual angle; determining a gaze area and a non-gaze area in the display area according to the area range, wherein the gaze area is adjacent to the non-gaze area; and adjusting a first gate driving signal input to the gaze area and a second gate driving signal input to the non-gaze area, so that a duty cycle of the first gate driving signal is greater than a duty cycle of the second gate driving signal, or a voltage of the first gate driving signal is greater than a voltage of the second gate driving signal, or a frequency of the first gate driving signal is less than a frequency of the second gate driving signal. As analyzed above, the control method of the embodiment of the present disclosure can improve the display effect of the display panel.

Further, the above control method can increase the maximum supportable resolution of the display panel, thereby further improving the display effect of the display panel.

In some embodiments of the present disclosure, the human eyes are more sensitive within a visual angle of 10 degrees, can correctly identify information at a visual angle of 10 to 20 degrees, and can be sensitive to dynamic things at a visual angle of 20 to 30 degrees. In combination with the recognition rules of human eyes for image information and the eye tracking technology, the display area can be divided into a gaze area and a non-gaze area. A better display effect is required in the gaze area to provide a user with more image information, while for the content in the non-gaze area, more turn-on time can be compensated to sub-pixels in the gaze area through reducing the turn-on time of each row of sub-pixels in the non-gaze area, thereby improving the display effect of the gaze area. In this way, the resolution of the screen can be increased without degrading the display effect.

The above method can be applied to extremely high-resolution products, which not only satisfies the display effect of the gaze area, but also improves the resolution of the gaze area in the case of limited compensation time.

Figure 3:
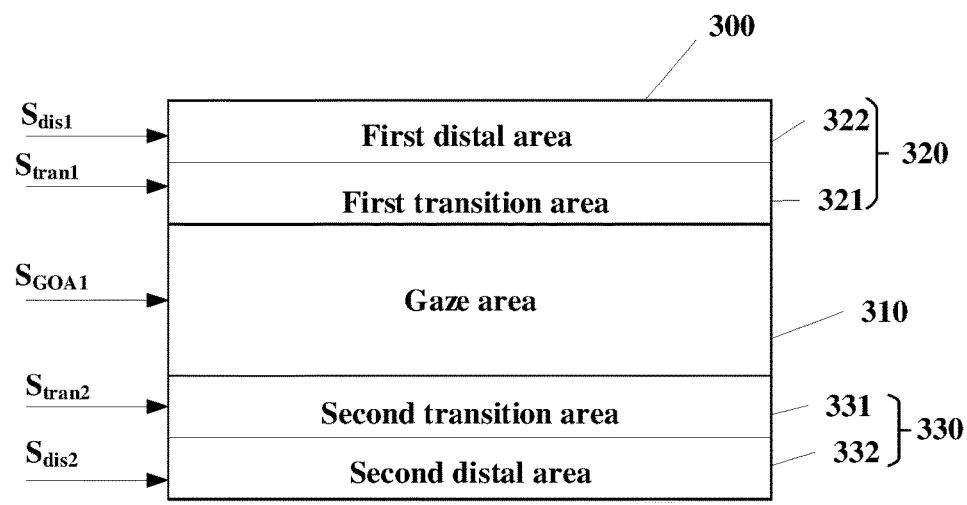
FIG. 3 is a schematic diagram illustrating partitioning a display area of a display panel according to another embodiment of the present disclosure.

FIG. 3 is a schematic diagram illustrating partitioning a display area of a display panel according to another embodiment of the present disclosure. FIG. 3 shows a display area 300 comprising a gaze area 310 and non-gaze areas 320 and 330. For example, the non-gaze area 320 can be referred to as a first non-gaze area, and the non-gaze area 330 can be referred to as a second non-gaze area. The first non-gaze area 320 and the second non-gaze area 330 are respectively on opposite sides of the gaze area 310.

In some embodiments, the non-gaze area comprises a transition area adjacent to the gaze area and a distal area on a side of the transition area away from the gaze area. For example, as shown in FIG. 3, the first non-gaze area 320 comprises a first transition area 321 adjacent to the gaze area 310 and a first distal area 322 on a side of the first transition area 321 away from the gaze area 310; and the second non-gaze area 330 comprises a second transition area 331 adjacent to the gaze area 310 and a second distal area 332 on aside of the second transition area 331 away from the gaze area 310.

In some embodiments, in a case where apart of the sub-display areas of the display area is determined as the gaze area, a transition area and a distal area can be set for the remaining part of the sub-display areas according to a preset area setting scheme. For example, a predetermined number of sub-display areas closest to the gaze area can be set as transition areas, and the remaining sub-display areas except the gaze area and transition areas can be set as distal areas. For example, two sub-display areas closest to the gaze area (for example, one sub-display area on each side of the gaze area respectively) can be set as transition areas, and the remaining sub-display areas except the gaze area and transition areas can be set as distal areas.

In addition, FIG. 3 further shows the first gate driving signal $S_{GOA1}$ input to the gaze area 310.

In some embodiments, the second gate driving signal comprises a transition area gate driving signal input to the transition area and a distal area gate driving signal input to the distal area. For example, FIG. 3 shows a first transition area gate driving signal $S_{tran1}$ input to the first transition area 321 and a first distal area gate driving signal $S_{dis1}$ input to the first distal area 322, wherein the first transition area gate driving signal $S_{tran1}$ and the first distal area gate driving signal $S_{dis1}$ together serve as the second gate driving signal input to the first non-gaze area 320. For another example, FIG. 3 shows a second transition area gate driving signal $S_{tran2}$ input to the second transition area 331 and a second distal area gate driving signal $S_{dis2}$ input to the second distal area 332, wherein the second transition area gate driving signal $S_{tran2}$ and the second distal area gate driving signal $S_{dis2}$ together serve as the second gate driving signal input to the second non-gaze area 330.

In some embodiments, the adjusting of the second gate driving signal comprises: adjusting the transition area gate driving signal and the distal area gate driving signal, so that a duty cycle of the transition area gate driving signal is greater than a duty cycle of the distal area gate driving signal, or a voltage of the transition area gate driving signal is greater than a voltage of the distal area gate driving signal, or a frequency of the transition area gate driving signal is less than a frequency of the distal area gate driving signal.

For example, in the process of adjusting the second gate driving signal input to the first non-gaze area 320, the first transition area gate driving signal $S_{tran1}$ and the first distal area gate driving signal $S_{dis1}$ are adjusted so that a duty cycle of the first transition area gate driving signal $S_{tran1}$ is greater than a duty cycle of the first distal area gate driving signal $S_{dis1}$, or a voltage of the first transition area gate driving signal $S_{tran1}$ is greater than a voltage of the first distal area gate driving signal $S_{dis1}$, or a frequency of the first transition area gate driving signal $S_{tran1}$ is less than a frequency of the first distal area gate driving signal $S_{dis1}$.

For another example, in the process of adjusting the second gate driving signal input to the second non-gaze area 330, the second transition area gate driving signal $S_{tran2}$ and the second distal area gate driving signal $S_{dis2}$ are adjusted so that a duty cycle of the second transition area gate driving signal $S_{tran2}$ is greater than a duty cycle of the second distal area gate driving signal $S_{dis2}$, or a voltage of the second transition area gate driving signal $S_{tran2}$ is greater than a voltage of the second distal area gate driving signal $S_{dis2}$ or a frequency of the second transition area gate driving signal $S_{tran2}$ is less than a frequency of the second distal area gate driving signal $S_{dis2}$.

By setting a transition area in the non-gaze area, the gaze area can be transitioned to a non-transition area more uniformly, thereby improving the integrity of the display effect of the display panel.

Taking the turn-on time of sub-pixels in a corresponding row caused by adjusting the duty ratio or frequency of the gate driving signal as an example, for example, the turn-on time of each row of sub-pixels in the gaze area is T, the turn-on time of each row of sub-pixels in the transition area may be 90% T or 80% T, and the turn-on time of each row of sub-pixels in the distal area may be 70% T, and so on. In this way, a part of an image displayed in the gaze area can be more smoothly and uniformly transitioned to another part of an image displayed in a non-transition area, thereby improving the integrity of the display effect of the display panel.

In some embodiments, the turn-on time of each row of sub-pixels in different transition areas may be different, and gamma voltages in different areas may also be adjusted to ensure a uniform display effect.

Figure 4:
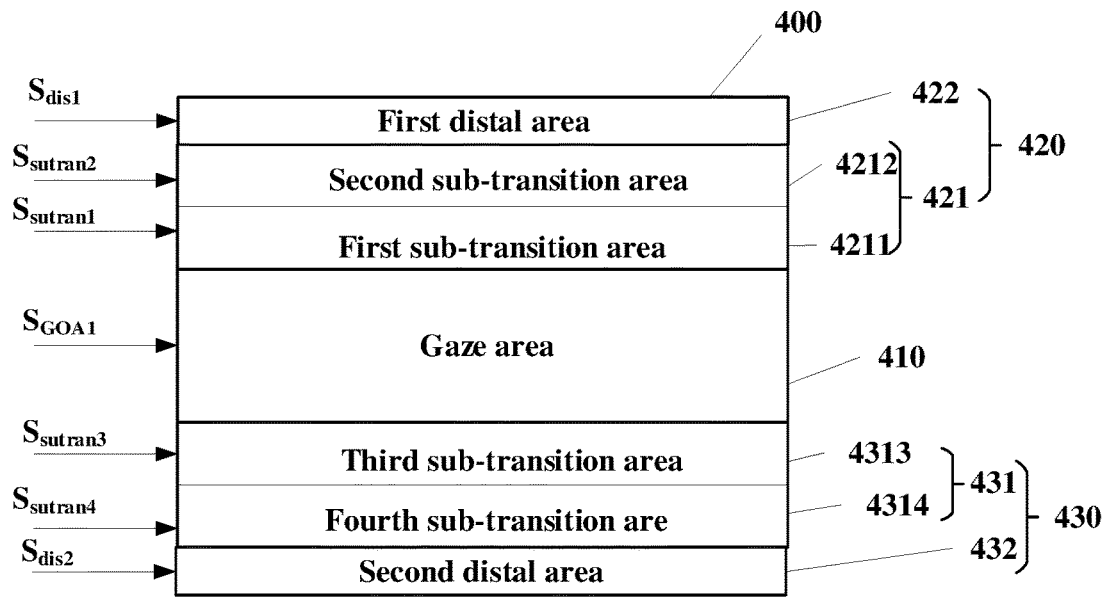
FIG. 4 is a schematic diagram illustrating partitioning a display area of a display panel according to still another embodiment of the present disclosure.

FIG. 4 is a schematic diagram illustrating partitioning a display area of a display panel according to still another embodiment of the present disclosure.

FIG. 4 shows a display area 400 comprising a gaze area 410, a first non-gaze area 420 and a second non-gaze area 430. The first non-gaze area 420 comprises a first transition area 421 and a first distal area 422; and the second non-gaze area 430 comprises a second transition area 431 and a second distal area 432.

In some embodiments, the transition area comprises a plurality of sub-transition areas arranged along a direction from the gaze area to the distal area. For example, as shown in FIG. 4, the first transition area 421 comprises a first sub-transition area 4211 and a second sub-transition area 4212, wherein the first sub-transition area 4211 and the second sub-transition area 4212 are arranged along a direction from the gaze area 410 to the first distal area 422. For another example, as shown in FIG. 4, the second transition area 431 comprises a third sub-transition area 4313 and a fourth sub-transition area 4314, wherein the third sub-transition area 4313 and the fourth sub-transition area 4314 are arranged along a direction from the gaze area 410 to the second distal area 432.

Similar to that described above, in a case where a part of the sub-display areas of the display area is determined as the gaze area, and another part of the sub-display areas is determined as the distal area, a plurality of sub-transition areas can be set according to a preset area setting scheme in the remaining part of the sub-display areas. For example, a predetermined number of sub-display areas closest to the gaze area can be set as the first sub-transition areas, and remaining sub-display areas except the gaze area, the distal areas, and the first sub-transition areas can be set as the second sub-transition areas. For example, two sub-display areas closest to the gaze area (for example, one sub-display area on each side of the gaze area respectively) can be set as the first sub-transition areas, and the remaining sub-display areas except the gaze area, the distal areas and the first sub-transition areas can be set as the second sub-transition areas.

In addition, FIG. 4 further shows a first gate driving signal $S_{GOA1}$ input to the gaze area 410, a first distal area gate driving signal $S_{dis1}$ input to the first distal area 422, and a second distal area gate driving signal $S_{dis2}$ input to the second distal area 432.

In some embodiments, the transition area gate driving signal comprises a sub-transition area gate driving signal input to each sub-transition area of the plurality of sub-transition areas. That is, the transition area gate driving signal comprises a plurality of sub-transition area gate driving signals input to the plurality of sub-transition areas, the plurality of sub-transition area gate driving signals being in one-to-one correspondence with the plurality of sub-transition areas. For example, FIG. 4 shows a first sub-transition area gate driving signal $S_{sutran4}$ input to the first sub-transition area 4211, a second sub-transition area gate driving signal $S_{sutran2}$ input to the second sub-transition area 4212, a third sub-transition area gate driving signal $S_{sutran3}$ input to the third sub-transition area 4313, and a fourth sub-transition area gate driving signal $S_{sutran4}$ input to the fourth sub-transition area 4314.

In some embodiments, the adjusting of the transition area gate driving signal comprises: adjusting a plurality of sub-transition area gate driving signals input to the plurality of sub-transition areas, so that the closer a sub-transition area is to the gaze area, the greater a duty ratio or a voltage of a sub-transition area gate driving signal input to the sub-transition area, or the less a frequency of the sub-transition area gate driving signal input to the sub-transition area.

For example, as shown in FIG. 4, in the case where the first sub-transition area 4211 is closer to the gaze area 410 than the second sub-transition area 4212, a duty cycle or a voltage of the first sub-transition area gate driving signal $S_{sutran1}$ is greater than a duty cycle or a voltage of the second sub-transition area gate driving signal $S_{sutran2}$, or a frequency of the first sub-transition area gate driving signal $S_{sutran1}$ is less than a frequency of the second sub-transition area gate driving signal $S_{sutran2}$.

For another example, as shown in FIG. 4, in the case where the third sub-transition area 4313 is closer to the gaze area 410 than the four sub-transition area 4314, a duty cycle or a voltage of the third sub-transition area gate driving signal $S_{sutran3}$ is greater than a duty cycle or a voltage of the fourth sub-transition area gate driving signal $S_{sutran4}$, or a frequency of the third sub-transition area gate driving signal $S_{sutran3}$ is less than a frequency of the fourth sub-transition area gate driving signal $S_{sutran4}$.

By setting a plurality of sub-transition areas in the transition area, the gaze region can be transitioned to a non-transition area more smoothly and uniformly, thereby improving the integrity of the display effect of the display panel.

Figure 6:
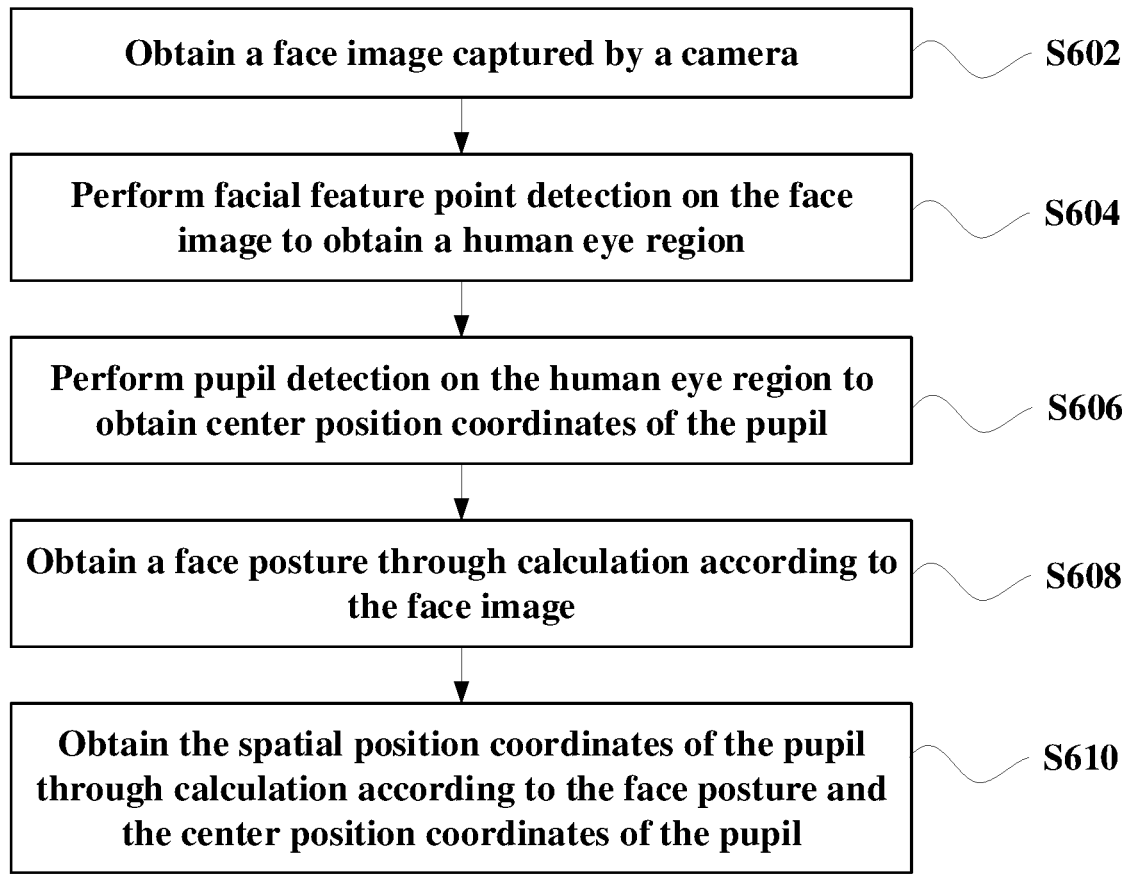
FIG. 6 is a flowchart illustrating a method for obtaining spatial position coordinates of a pupil according to an embodiment of the present disclosure.

FIG. 6 is a flowchart illustrating a method for obtaining spatial position coordinates of a pupil according to an embodiment of the present disclosure. As shown in FIG. 6, the method comprises steps S602 to S610.

At step S602, a face image captured by a camera is obtained. For example, a high-resolution image can be captured by the camera, and the high-resolution image is then converted into a low-resolution image (for example, with a resolution of 640×480) through image processing. And then a face image can be obtained from the low-resolution image.

For example, the camera is set on a screen, and a distance that human eyes watch the screen is a distance between the human eyes and the camera. For example, the distance is 540 mm (millimeters). In this case, when the line of sight is near the optical axis of the camera, the accuracy of the camera can be ±12 mm (that is, a visual angle of J=1.3°), and when the line of sight is off the optical axis of the camera, the accuracy of the camera can be ±20-30 mm (that is, a visual angle of J=2.2°-3.2°). In such a case, the camera is used to acquire a face image.

At step S604, facial feature point detection is performed on the face image to obtain a human eye region. That is, the human eye region is obtained through the facial feature point detection. The facial feature point detection is a known technique, and will not be described in detail here.

At step S606, pupil detection is performed on the human eye region to obtain center position coordinates of a pupil. For example, the center position coordinates of the pupil can be obtained from a portion of the high-resolution image corresponding to the human eye region.

At step S608, a face posture is obtained through calculation according to the face image.

At step S610, the spatial position coordinates of the pupil are obtained through calculation according to the face posture and the center position coordinates of the pupil. Herein, the spatial position coordinates of the pupil can be obtained using a known calculation method according to the face posture and the center position coordinates of the pupil.

Heretofore, a method for obtaining spatial position coordinates of a pupil according to an embodiment of the present disclosure is provided. With the method, spatial position coordinates of the pupil can be obtained, thereby facilitating the subsequent distinction between a gaze area and a non-gaze area of the display area.

Figure 7:
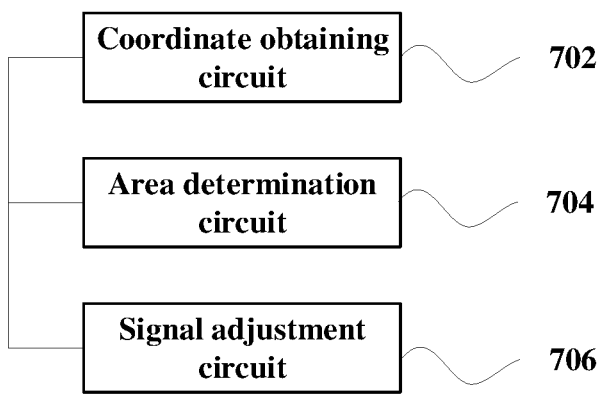
FIG. 7 is a schematic structural diagram illustrating a control device for a display panel according to an embodiment of the present disclosure.

FIG. 7 is a schematic structural diagram illustrating a control device for a display panel according to an embodiment of the present disclosure. As shown in FIG. 7, the control device comprises a coordinate obtaining circuit 702, an area determination circuit 704 and a signal adjustment circuit 706.

The coordinate obtaining circuit 702 is configured to obtain spatial position coordinates of a pupil of a user, and determine coordinates of a gaze point in a display area of a display panel viewed by the user according to the spatial position coordinates of the pupil.

In some embodiments, the coordinate obtaining circuit 702 is configured to obtain a face image captured by a camera, perform facial feature point detection on the face image to obtain a human eye region, perform pupil detection on the human eye region to obtain center position coordinates of the pupil, obtain a face posture through calculation according to the face image, and obtain the spatial position coordinates of the pupil through calculation according to the face posture and the center position coordinates of the pupil.

The area determination circuit 704 is configured to determine an area range that the pupil of the user is gazing in the display area according to the spatial position coordinates of the pupil, the coordinates of the gaze point and a preset visual angle, and determine a gaze area and a non-gaze area in the display area according to the area range. The gaze area is adjacent to the non-gaze area.

In some embodiments, the area determination circuit 704 is configured to calculate a distance between the pupil and the gaze point according to the spatial position coordinates of the pupil and the coordinates of the gaze point, and determine the area range that the pupil of the user is gazing in the display area according to the distance and the preset visual angle.

In some embodiments, the display area comprises a plurality of sub-display areas, and each sub-display area comprises a plurality of rows of sub-pixels. The area determination circuit 704 is configured to obtain a sub-display area at least partially overlapping with the area range from the plurality of sub-display areas, use the sub-display area at least partially overlapping with the area range as the gaze area, and use a remaining sub-display area in the plurality of sub-display areas except for the sub-display area serving as the gaze area as the non-gaze area.

The signal adjustment circuit 706 is configured to adjust a first gate driving signal input to the gaze area and a second gate driving signal input to the non-gaze area, so that a duty cycle of the first gate driving signal is greater than a duty cycle of the second gate driving signal, or a voltage of the first gate driving signal is greater than a voltage of the second gate driving signal, or a frequency of the first gate driving signal is less than a frequency of the second gate driving signal.

In some embodiments, the display panel comprises a plurality of gate driving circuits. The signal adjustment circuit 706 is configured to output a first control signal to a portion of gate driving circuits corresponding to the gaze area in the plurality of gate driving circuits to cause the portion of the gate driving circuits to output the first gate driving signal, and output a second control signal to another portion of gate driving circuits corresponding to the non-gaze area in the plurality of gate driving circuits to cause the another portion of the gate driving circuits to output the second gate driving signal. Herein, the duty cycle of the first gate driving signal is greater than the duty cycle of the second gate driving signal, or the voltage of the first gate driving signal is greater than the voltage of the second gate driving signal, or the frequency of the first gate driving signal is less than the frequency of the second gate driving signal.

In some embodiments, the plurality of gate driving circuits comprise a plurality of groups of gate driving circuits connected to the plurality of sub-display areas in a one-to-one correspondence. Each group of the plurality of groups of gate driving circuits is configured to independently receive the first control signal or the second control signal. The signal adjustment circuit 706 is configured to, for any one sub-display area of the plurality of sub-display areas, output the first control signal to a group of gate driving circuits corresponding to the any one sub-display area in a case where the any one sub-display area is determined to belong to the gaze area, and output the second control signal to a group of gate driving circuits corresponding to the any one sub-display area in a case where the any one sub-display area is determined to belong to the non-gaze area. In this way, the group of gate driving circuits corresponding to the any one sub-display area output the first gate driving signal in the case where the any one sub-display area is determined to belong to the gaze area, and the group of gate driving circuits corresponding to the anyone sub-display area output the second gate driving signal in the case where the any one sub-display area is determined to belong to the non-gaze area.

In some embodiments, the non-gaze area comprises a transition area adjacent to the gaze area and a distal area on a side of the transition area away from the gaze area. The second gate driving signal comprises a transition area gate driving signal input to the transition area and a distal area gate driving signal input to the distal area. The signal adjustment circuit 706 is configured to adjust the transition area gate driving signal and the distal area gate driving signal, so that a duty cycle of the transition area gate driving signal is greater than a duty cycle of the distal area gate driving signal, or a voltage of the transition area gate driving signal is greater than a voltage of the distal area gate driving signal, or a frequency of the transition area gate driving signal is less than a frequency of the distal area gate driving signal.

In some embodiments, the transition area comprises a plurality of sub-transition areas arranged along a direction from the gaze area to the distal area. The transition area gate driving signal comprises a sub-transition area gate driving signal input to each sub-transition area of the plurality of sub-transition areas. The signal adjustment circuit 706 is configured to adjust a plurality of sub-transition area gate driving signals input to the plurality of sub-transition areas, so that the closer a sub-transition area is to the gaze area, the greater a duty ratio or a voltage of a sub-transition area gate driving signal input to the sub-transition area, or the less a frequency of the sub-transition area gate driving signal input to the sub-transition area.

Heretofore, a control device according to some embodiments of the present disclosure is provided. The control device comprises a coordinate obtaining circuit, an area determination circuit and a signal adjustment circuit. The coordinate obtaining circuit is configured to obtain spatial position coordinates of a pupil of a user, and determine coordinates of a gaze point in a display area of a display panel viewed by the user according to the spatial position coordinates of the pupil. The area determination circuit is configured to determine an area range that the pupil of the user is gazing in the display area according to the spatial position coordinates of the pupil, the coordinates of the gaze point and a preset visual angle, and determine a gaze area and a non-gaze area in the display area according to the area range. The signal adjustment circuit is configured to adjust a first gate driving signal input to the gaze area and a second gate driving signal input to the non-gaze area, so that a duty cycle of the first gate driving signal is greater than a duty cycle of the second gate driving signal, or a voltage of the first gate driving signal is greater than a voltage of the second gate driving signal, or a frequency of the first gate driving signal is less than a frequency of the second gate driving signal. The control device can improve the display effect of the display panel. Further, the control device can increase the maximum supportable resolution of the display panel, thereby further improving the display effect of the display panel.

Figure 8:
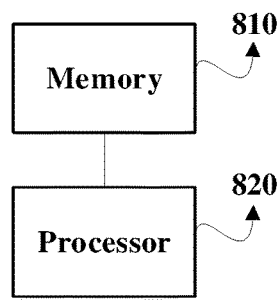
FIG. 8 is a schematic structural diagram illustrating a control device for a display panel according to another embodiment of the present disclosure.

FIG. 8 is a schematic structural diagram illustrating a control device for a display panel according to another embodiment of the present disclosure. The control device comprises a memory 810 and a processor 820.

The memory 810 may be a magnetic disk, flash memory or any other non-volatile storage medium. The memory is used to store instructions of corresponding embodiments shown in FIG. 1 and/or FIG. 6.

The processor 820 is coupled to memory 810 and may be implemented as one or more integrated circuits, such as a microprocessor or microcontroller. The processor 820 is used to execute the instructions stored in the memory and can effectively improve the display effect of the display panel.

Figure 9:
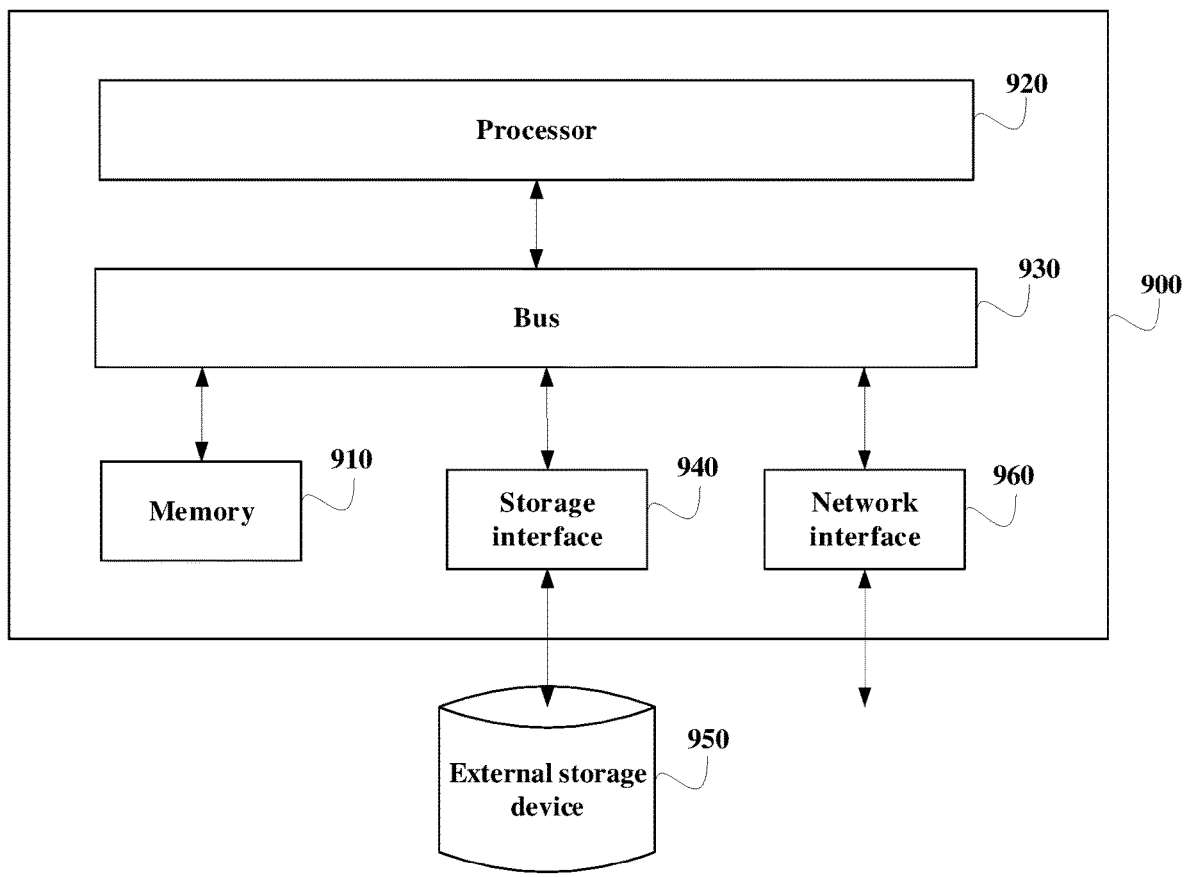
FIG. 9 is a schematic structural diagram illustrating a control device for a display panel according to still another embodiment of the present disclosure.

In some embodiments, as illustrated in FIG. 9, a control device 900 comprises a memory 910 and a processor 920. The processor 920 is coupled to the memory 910 via a bus 930. The control device 900 may be further connected to an external storage device 950 through a storage interface 940 to access external data, and may be further connected to a network or another computer system (not shown) through a network interface 960, which will not be described in detail herein.

In the embodiment, through storing data instructions in memory and processing the above instructions using a processor, the display effect of the display panel can be improved.

According to some embodiments of the present disclosure, there is also provided a display device, comprising the control device described above (e.g., the control device shown in FIG. 7, FIG. 8 or FIG. 9). For example, the display device may be any product or component having a display function, such as a display panel, a mobile phone, a tablet computer, a television, a display, a notebook computer, a digital photo frame, a navigator, or the like.

Figure 10:
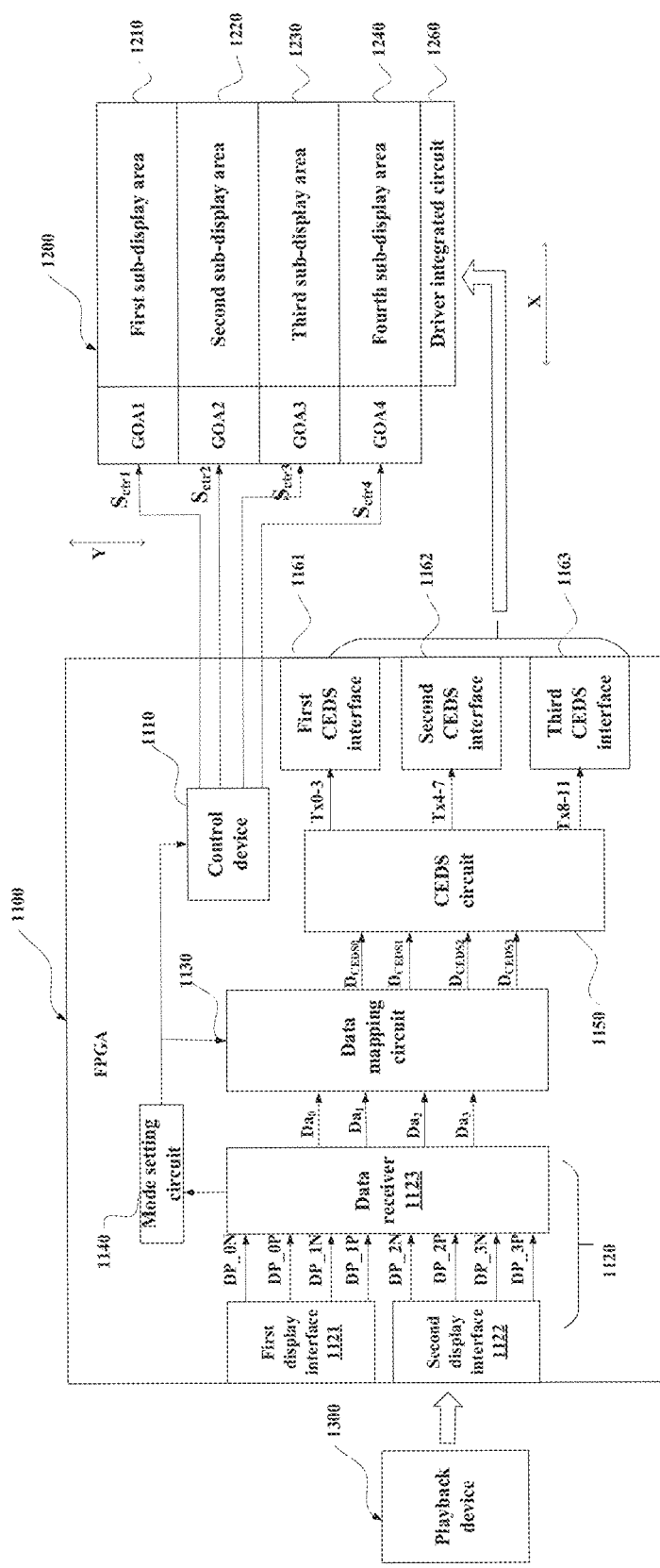
FIG. 10 is a schematic structural diagram showing a display device according to an embodiment of the present disclosure.

FIG. 10 is a schematic structural diagram showing a display device according to an embodiment of the present disclosure.

As shown in FIG. 10, the display device comprises a display panel 1200. The display panel 1200 comprises a first sub-display area 1210, a second sub-display area 1220, a third sub-display area 1230, and a fourth sub-display area 1240. The display panel 1200 comprises four groups of gate driving circuits, namely a first group of gate driving circuits GOA1, a second group of gate driving circuits GOA2, a third group of gate driving circuits GOA3, and a fourth group of gate driving circuits GOA4. The first group of gate driving circuits GOA1 is electrically connected to the first sub-display area 1210, the second group of gate driving circuits GOA2 is electrically connected to the second sub-display area 1220, the third group of gate driving circuits GOA3 is electrically connected to the third sub-display area 1230, and the fourth group of gate driving circuits GOA4 is electrically connected to the fourth sub-display area 1240. Each group of gate driving circuits is independently controlled by a first control signal or a second control signal, and gate driving circuits in different groups do not transmit control signals to each other. Each group of gate driving circuits may comprise a plurality of gate driving circuits, and each gate driving circuit is electrically connected to a corresponding row of sub-pixels. In addition, the display panel 1200 further comprises a driver integrated circuit 1260. The driver integrated circuit 1260 is configured to receive display data and transmit the display data to a corresponding sub-pixel.

As shown in FIG. 10, the display device further comprises an FPGA (Field Programmable Gate Array) 1100. The FPGA 1100 comprises a control device 1110. For example, the control device 1110 is the control device shown in FIG. 7, FIG. 8 or FIG. 9. For example, the control device 1110 may be a timing controller.

For example, as shown in FIG. 10, the control device 1110 sends four control signals $S_{ctr1}$ to $S_{ctr4}$ to four groups of gate driving circuits of the display panel. Here, the control signal $S_{ctr1}$ is sent to the first group of gate driving circuits GOA1, the control signal $S_{ctr2}$ is sent to the second group of gate driving circuits GOA2, the control signal $S_{ctr3}$ is sent to the third group of gate driving circuits GOA3, and the control signal $S_{ctr4}$ is sent to the fourth group of gate driving circuits GOA4.

The control process of the control device 1110 will be described below by taking the second sub-display area 1220 and the third sub-display area 1230 as a gaze area, and the first sub-display area 1210 and the fourth sub-display area 1240 as non-gaze areas respectively. The control device 1110 outputs the control signals $S_{ctr2}$ and $S_{ctr3}$ (in this case, the control signals $S_{ctr2}$ and $S_{ctr3}$ are the first control signal) to gate driving circuits GOA2 and GOA3 corresponding to the gaze area so that these gate driving circuits GOA2 and GOA3 output a first gate driving signal; and outputs control signals $S_{ctr1}$ and $S_{ctr4}$ (in this case, the control signals $S_{ctr1}$ and $S_{ctr4}$ are used as the second control signal) to gate driving circuits GOA1 and GOA4 corresponding to the non-gaze areas, so that these gate driving circuits output a second gate driving signal, which makes a duty cycle of the first gate driving signal greater than a duty cycle of the second gate driving signal, or a voltage of the first gate driving signal greater than a voltage of the second gate driving signal, or a frequency of the first gate driving signal less than a frequency of the second gate driving signal.

Below, taking the second sub-display area 1220 as an example, the process of controlling any sub-display area by the control device 1110 will be described. For example, the control device 1110 outputs a first control signal to the second group of gate driving circuits GOA2 corresponding to the second sub-display area 1220 in a case where the second sub-display area 1220 is determined to belong to the gaze area, so that the second group of gate driving circuits GOA2 outputs the first gate driving signal; and the control device 1110 outputs a second control signal to the second group of gate driving circuits GOA2 corresponding to the second sub-display area 1220 in a case where the second sub-display area 1220 is determined to belong to the non-gaze area, so that the second group of gate driving circuits GOA2 outputs the second gate driving signal. In this way, whether a group of gate driving circuits corresponding to the sub-display area output the first gate driving signal or the second gate driving signal is adjusted according to whether the sub-display area belongs to the gaze area or the non-gaze area.

In some embodiments, as shown in FIG. 10, the FPGA 1100 further comprises a display interface circuit 1120. The display interface circuit 1120 is configured to parse received image information. For example, as shown in FIG. 10, the display interface circuit 1120 comprises a first display interface 1121, a second display interface 1122 and a data receiver 1123. The first display interface 1121 and the second display interface 1122 are configured to receive image information and transmit the image information to the data receiver 1123 in the form of interface data. For example, as shown in FIG. 10, the first display interface 1121 transmits interface data DP_0N, DP_0P, DP_1N and DP_1P to the data receiver 1123, and the second display interface 1122 transmits interface data DP_2N, DP_2P, DP_3N and DP_3P to the data receiver 1123. The data receiver 1123 parses the image information, and sends parsed image information to a data mapping circuit 1130.

In some embodiments, as shown in FIG. 10, the FPGA 1100 further comprises the data mapping circuit 1130. The data mapping circuit 1130 is electrically connected to the display interface circuit 1120. The data mapping circuit 1130 is configured to map the parsed image information into display data and input the display data to the display panel 1200. For example, the data mapping circuit 1130 receives parsed image data $Da_0$ to $Da_3$ from the data receiver 1123, and then transmits the parsed image data $Da_0$ to $Da_3$ to a CEDS (Clock Embedded Differential Signal) circuit 1150 in the form of CEDS data $D_{CEDS0}$ to $D_{CEDS3}$ (as display data). In some embodiments, the data mapping circuit 1130 comprises a plurality of buffers.

In some embodiments, as shown in FIG. 10, the FPGA 1100 further comprises the CEDS circuit 1150. The CEDS circuit 1150 is configured to send CEDS data to the driver integrated circuit 1260 through a CEDS interface. For example, the CEDS circuit 1150 converts the CEDS data into a plurality of sets of transmission data Tx0-Tx11 (also used as display data), and sends a first part Tx0-Tx3 of the plurality of sets of transmission data to the driver integrated circuit 1260 through a first CEDS interface 1161, sends a second part Tx4-Tx7 of the plurality of sets of transmission data to the driver integrated circuit 1260 through a second CEDS interface 1162, and sends a third part Tx8-Tx11 of the plurality of sets of transmission data to the driver integrated circuit 1260 through a third CEDS interface 1163.

In some embodiments, the FPGA 1100 further comprises a mode setting circuit 1140. The mode setting circuit 1140 is configured to set a display mode and transmit the display mode to the data mapping circuit 1130 and the control device 1110. For example, the mode setting circuit 1140 can know a display mode to be used (for example, 2D mode (two-dimension display mode) or LF 3D mode (Light field three-dimension display mode)) from the data of the data receiver 1123, and then transmit the display mode to the data mapping circuit 1130 and the control device 1110. The data mapping circuit 1130 is configured to map the parsed image information into corresponding display data according to the display mode. The control device 1110 is configured to output a first control signal corresponding to the gaze area and a second control signal corresponding to the non-gaze area according to the display mode.

Heretofore, the structure of the FPGA according to some embodiments of the present disclosure has been described.

In some embodiments, as shown in FIG. 10, the display device further comprises a playback device 1300. For example, the playback device 1300 is configured to emit image information. For another example, the playback device 1300 is further configured to emit coordinate information and the like. As a front-end device, the playback device 1300 can receive eye tracking information from a camera to form a coordinate file, process a corresponding image according to the coordinate file, arrange image pixels, and transmit them to the FPGA 1100.

Heretofore, the structure of the display device according to some embodiments of the present disclosure has been described. The display effect of the display device can be improved. In addition, the maximum supportable resolution of the display device can also be increased.

In some embodiments, the present disclosure further provides a non-transitory computer readable storage medium having computer program instructions stored thereon that, when executed by a processor, implement steps of the method of the embodiment corresponding to FIG. 1 and/or FIG. 6. One skilled in the art should understand that, the embodiments of the present disclosure may be provided as a method, an apparatus, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical memory, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing apparatus to generate a machine such that the instructions executed by a processor of a computer or other programmable data processing apparatus to generate means for implementing the functions specified in one or more flows of the flowcharts and/or one or more blocks of the block diagrams.

The computer program instructions may also be stored in a computer readable memory device capable of directing a computer or other programmable data processing apparatus to operate in a specific manner such that the instructions stored in the computer readable memory device produce an article of manufacture comprising instruction means implementing the functions specified in one or more flows of the flowcharts and/or one or more blocks of the block diagrams.

These computer program instructions can also be loaded onto a computer or other programmable data processing apparatus to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

Heretofore, various embodiments of the present disclosure have been described in detail. In order to avoid obscuring the concepts of the present disclosure, some details known in the art are not described. Based on the above description, those skilled in the art can understand how to implement the technical solutions disclosed herein.

Although some specific embodiments of the present disclosure have been described in detail by way of example, those skilled in the art should understand that the above examples are only for the purpose of illustration and are not intended to limit the scope of the present disclosure. It should be understood by those skilled in the art that the above embodiments may be modified or equivalently substituted for part of the technical features without departing from the scope and spirit of the present disclosure. The scope of the disclosure is defined by the appended claims.

What is claimed is:
1. A control method for a display panel, comprising:
obtaining spatial position coordinates of a pupil of a user;

determining coordinates of a gaze point in a display area of a display panel viewed by the user according to the spatial position coordinates of the pupil;

determining an area range that the pupil of the user is gazing in the display area according to the spatial position coordinates of the pupil, the coordinates of the gaze point and a preset visual angle;

determining a gaze area and a non-gaze area in the display area according to the area range, wherein the gaze area is adjacent to the non-gaze area, wherein the display area comprises a plurality of sub-display areas, and each sub-display area of the plurality of sub-display areas comprises a plurality of rows of sub-pixels, and the determining of the gaze area and the non-gaze area according to the area range comprises: obtaining a sub-display area at least partially overlapping with the area range from the plurality of sub-display areas, using the sub-display area at least partially overlapping with the area range as the gaze area, and using a remaining sub-display area in the plurality of sub-display areas except for the sub-display area serving as the gaze area as the non-gaze area; and adjusting a first gate driving signal input to the gaze area and a second gate driving signal input to the non-gaze area, so that a frequency of the first gate driving signal is less than a frequency of the second gate driving signal.

2. The control method according to claim 1, wherein:
the non-gaze area comprises a transition area adjacent to the gaze area and a distal area on a side of the transition area away from the gaze area;
the second gate driving signal comprises a transition area gate driving signal input to the transition area and a distal area gate driving signal input to the distal area;
wherein the adjusting of the second gate driving signal comprises: adjusting the transition area gate driving signal and the distal area gate driving signal, so that a duty cycle of the transition area gate driving signal is greater than a duty cycle of the distal area gate driving signal, or a voltage of the transition area gate driving signal is greater than a voltage of the distal area gate driving signal, or a frequency of the transition area gate driving signal is less than a frequency of the distal area gate driving signal.

3. The control method according to claim 2, wherein:
the transition area comprises a plurality of sub-transition areas arranged along a direction from the gaze area to the distal area;
the transition area gate driving signal comprises a plurality of sub-transition area gate driving signals input to the plurality of sub-transition areas, the plurality of sub-transition area gate driving signals being in one-to-one correspondence with the plurality of sub-transition areas;
wherein the adjusting of the transition area gate driving signal comprises: adjusting the plurality of sub-transition area gate driving signals input to the plurality of sub-transition areas, so that the closer a sub-transition area is to the gaze area, the greater a duty ratio or a voltage of a sub-transition area gate driving signal input to the sub-transition area, or the less a frequency of the sub-transition area gate driving signal input to the sub-transition area.

4. The control method according to claim 1, wherein the display panel comprises a plurality of gate driving circuits; and the adjusting of the first gate driving signal and the second gate driving signal comprises:

outputting a first control signal to a portion of gate driving circuits corresponding to the gaze area in the plurality of gate driving circuits to cause the portion of the gate driving circuits to output the first gate driving signal, and outputting a second control signal to another portion of gate driving circuits corresponding to the non-gaze area in the plurality of gate driving circuits to cause the another portion of the gate driving circuits to output the second gate driving signal.

5. The control method according to claim 4, wherein:
the plurality of gate driving circuits comprise a plurality of groups of gate driving circuits connected to the plurality of sub-display areas in a one-to-one correspondence, each group of the plurality of groups of gate driving circuits being configured to independently receive the first control signal or the second control signal; and
the outputting of the first control signal or the outputting of the second control signal comprises:
for any one sub-display area of the plurality of sub-display areas, outputting the first control signal to a group of gate driving circuits corresponding to the any one sub-display area in a case where the any one sub-display area is determined to belong to the gaze area, and outputting the second control signal to a group of gate driving circuits corresponding to the any one sub-display area in a case where the any one sub-display area is determined to belong to the non-gaze area.

6. The control method according to claim 1, wherein the determining of the area range that the pupil of the user is gazing in the display area comprises:
calculating a distance between the pupil and the gaze point according to the spatial position coordinates of the pupil and the coordinates of the gaze point; and
determining the area range that the pupil of the user is gazing in the display area according to the distance and the preset visual angle.

7. The control method according to claim 1, wherein the obtaining of the spatial position coordinates of the pupil comprises:
obtaining a face image captured by a camera;
performing facial feature point detection on the face image to obtain a human eye region;
performing pupil detection on the human eye region to obtain center position coordinates of the pupil;
obtaining a face posture through calculation according to the face image; and
obtaining the spatial position coordinates of the pupil through calculation according to the face posture and the center position coordinates of the pupil.

8. A control device for a display panel, comprising:
a memory; and
a processor coupled to the memory, the processor configured to, based on instructions stored in the memory, carry out the method according to claim 1.

9. A field programmable gate array (FPGA), comprising:
the control device according to claim 8.

10. The FPGA according to claim 9, further comprising:
a display interface circuit configured to parse received image information; and
a data mapping circuit electrically connected to the display interface circuit and configured to map parsed image information into display data and input the display data to a display panel.

11. The FPGA according to claim 10, further comprising:
a mode setting circuit configured to set a display mode and transmit the display mode to the data mapping circuit and the control device;
wherein the data mapping circuit is configured to map the parsed image information into corresponding display data according to the display mode; and
the control device is configured to output a first control signal corresponding to the gaze area and a second control signal corresponding to the non-gaze area according to the display mode.

12. A display device, comprising: a control device according to claim 8.

13. A non-transitory computer readable storage medium on which computer program instructions are stored, which when executed by a processor implement the method according to claim 1.

14. A control device for a display panel, comprising:
a coordinate obtaining circuit configured to obtain spatial position coordinates of a pupil of a user, and determine coordinates of a gaze point in a display area of a display panel viewed by the user according to the spatial position coordinates of the pupil;
an area determination circuit configured to determine an area range that the pupil of the user is gazing in the display area according to the spatial position coordinates of the pupil, the coordinates of the gaze point and a preset visual angle, and determine a gaze area and a non-gaze area in the display area according to the area range, wherein the gaze area is adjacent to the non-gaze area, wherein the display area comprises a plurality of sub-display areas, and each sub-display area of the plurality of sub-display areas comprises a plurality of rows of sub-pixels, and the area determination circuit is configured to obtain a sub-display area at least partially overlapping with the area range from the plurality of sub-display areas, use the sub-display area at least partially overlapping with the area range as the gaze area, and use a remaining sub-display area in the plurality of sub-display areas except for the sub-display area serving as the gaze area as the non-gaze area; and
a signal adjustment circuit configured to adjust a first gate driving signal input to the gaze area and a second gate driving signal input to the non-gaze area, so that a frequency of the first gate driving signal is less than a frequency of the second gate driving signal.

* * * * *